(12) United States Patent
Oono

(10) Patent No.: US 11,204,202 B2
(45) Date of Patent: Dec. 21, 2021

(54) DOUBLE PIPE AND METHOD FOR MANUFACTURING SAME

(71) Applicant: Marelli Corporation, Saitama (JP)

(72) Inventor: Hiroyuki Oono, Saitama (JP)

(73) Assignee: HIGHLY MARELLI JAPAN CORPORATION, Tokyo (JP)

( * ) Notice: Subject to any disclaimer, the term of this patent is extended or adjusted under 35 U.S.C. 154(b) by 9 days.

(21) Appl. No.: 16/630,529

(22) PCT Filed: Jul. 13, 2018

(86) PCT No.: PCT/JP2018/026606
§ 371 (c)(1),
(2) Date: Jan. 13, 2020

(87) PCT Pub. No.: WO2019/013345
PCT Pub. Date: Jan. 17, 2019

(65) Prior Publication Data
US 2020/0166281 A1    May 28, 2020

(30) Foreign Application Priority Data

Jul. 14, 2017 (JP) ............................. JP2017-137675
Oct. 4, 2017 (JP) ............................. JP2017-194466
Jul. 11, 2018 (JP) ............................. JP2018-131724

(51) Int. Cl.
| | | |
|---|---|---|
| *F28D 7/10* | (2006.01) | |
| *F16L 9/18* | (2006.01) | |
| *F28F 1/40* | (2006.01) | |

(52) U.S. Cl.
CPC ................ *F28D 7/106* (2013.01); *F16L 9/18* (2013.01); *F28F 1/40* (2013.01); *F28F 2230/00* (2013.01); *F28F 2275/122* (2013.01)

(58) Field of Classification Search
CPC ..... F28D 7/106; F16L 9/18; F28F 1/40; F28F 2230/00; F28F 2275/122
(Continued)

(56) References Cited

U.S. PATENT DOCUMENTS

| | | | | |
|---|---|---|---|---|
| 6,098,704 A | * | 8/2000 | Tsuchiya ................ | B21C 23/10 165/154 |
| 2008/0030023 A1 | | 2/2008 | Kurata et al. | |
| 2012/0138024 A1 | * | 6/2012 | Taucher ................. | F02M 27/02 123/545 |

FOREIGN PATENT DOCUMENTS

| | | |
|---|---|---|
| GB | 1028000 A | 5/1966 |
| JP | 58-119057 U1 | 8/1983 |

(Continued)

*Primary Examiner* — Davis D Hwu
(74) *Attorney, Agent, or Firm* — Global IP Counselors, LLP

(57) ABSTRACT

A double pipe includes an outer pipe, an inner pipe, a fin member and a sealing part. The outer pipe has a plurality of outer crimping parts projecting to an inner diameter side and aligned in at least one of a lengthwise direction and a circumference direction. The inner pipe is arranged on an interior of the outer pipe with a flow path gap being defined between the outer pipe and the inner pipe. The inner pipe has a plurality of inner crimping parts aligned in the at least one of the lengthwise direction and the circumference direction and overlapping the outer crimping parts. The fin member is arranged on the interior of the inner pipe and held by the inner crimping parts. The sealing part seals between the outer pipe and the inner pipe.

5 Claims, 7 Drawing Sheets

(58) Field of Classification Search
USPC .......................................................... 165/154
See application file for complete search history.

(56) References Cited

FOREIGN PATENT DOCUMENTS

| | | | |
|---|---|---|---|
| JP | 07-041127 | U1 | 7/1995 |
| JP | 2000-146462 | A | 5/2000 |
| JP | 2000-161873 | A | 6/2000 |
| JP | 2003-314982 | A | 11/2003 |
| JP | 2007-155247 | A | 6/2007 |
| JP | 2009-162396 | A | 7/2009 |
| JP | 2009-186063 | A | 8/2009 |
| JP | 2013151013 | A * | 8/2013 |

* cited by examiner (A)

(B)

(A)

(B)

DOUBLE PIPE AND METHOD FOR MANUFACTURING SAME

CROSS-REFERENCE TO RELATED APPLICATIONS

This is a U.S. national phase application of PCT/JP2018/026606, filed on Jul. 13, 2018, which claims priority to Japanese Patent Application No. 2017-137675, filed on Jul. 14, 2017, Japanese Patent Application No. 2017-194466, filed on Oct. 4, 2017, and Japanese Patent Application No. 2018-131724, filed on Jul. 11, 2018. The entire disclosures of Japanese Patent Application Nos. 2017-137675, 2017-194466 and 2018-131724, are hereby incorporated herein by reference.

TECHNICAL FIELD

The present invention relates to a double pipe and a method for manufacturing the same.

BACKGROUND ART

Disclosed in Japanese Unexamined Patent Publication No. 2006-98038A is a heat exchange pipe comprising a spiral-shaped thin plate on the interior of the pipe.

During manufacturing of the heat exchange pipe, first, the thin plate is formed into a spiral shape. Thereafter, the formed spiral-shaped thin plate is inserted in the interior of the pipe.

SUMMARY

However, as a heat exchanger, it is conceivable to manufacture a double pipe with the heat exchange pipe described in Japanese Unexamined Patent Publication 2006-98038A interposed on the interior of an outer pipe.

When manufacturing the abovementioned double pipe, after fixing a spiral-shaped thin plate on the interior of the pipe, the pipe is fixed on the interior of the outer pipe, and thereafter, it is necessary to join the pipe and the outer pipe, and to form a sealing part.

However, in the abovementioned method for manufacturing a double pipe, there are many manufacturing man-hours. Because of that, there is a risk of the alignment of the pipe and the outer pipe becoming difficult, and of a decrease in the quality of the sealing part.

The purpose of the present invention is to provide a double pipe and a method for manufacturing the same for which the number of manufacturing man-hours is reduced, and the quality of the sealing part is increased.

With a mode of the present invention, provided is a double pipe, being a double pipe for which an inner pipe is provided having a flow path gap on the interior of an outer pipe, and a fin member is provided on the interior of the inner pipe, wherein the outer pipe has an outer crimping part projecting to the inner diameter side, the inner pipe has an inner crimping part overlapping the outer crimping part, between the outer pipe and the inner pipe is provided a sealing part that seals between the outer pipe and the inner pipe, and the fin member is held by the inner crimping part.

Also, with a mode of the present invention, provided is a manufacturing method for a double pipe, being a manufacturing method for a double pipe for which an inner pipe is provided having a flow path gap on the interior of an outer pipe, and a fin member is provided on the interior of the inner pipe, wherein the inner pipe is deformed by crimping the outer pipe to form an inner crimping part, by forming the inner crimping part, the fin member is held by the inner crimping part, and between the outer pipe and the inner pipe, provided is a sealing part that seals between the outer pipe and the inner pipe.

With the abovementioned modes, with the double pipe, the inner pipe is deformed by crimping the outer pipe to form the inner crimping part, and the fin member is held by the inner crimping part, and it is possible to reduce the number of man-hours for fixing members to each other. Also, the outer pipe and the inner pipe are made to overlap each other by crimping and are deformed, so the variation that occurs in the shape of the sealing part is suppressed. Thus, with the double pipe, the number of manufacturing man-hours is reduced, and the quality of the sealing part is increased.

DETAILED DESCRIPTION OF EMBODIMENTS

Following, an embodiment of the present invention is explained while referring to the attached drawings.

Figure 1:
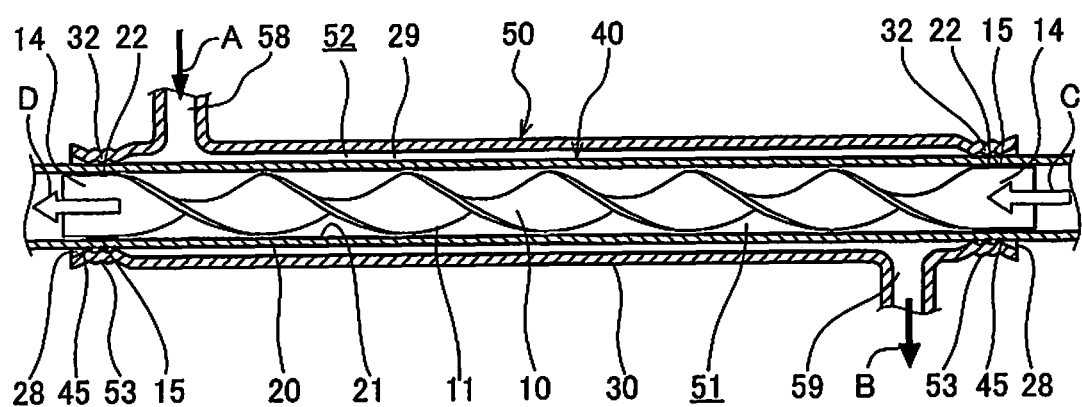
FIG. 1 is a cross section diagram showing a double pipe of an embodiment of the present invention.

FIG. 1 is a cross section diagram showing a double pipe 50 of the present embodiment. The double pipe 50 is provided as a heat exchanger in which a refrigerant (fluid) of an air conditioning device (not illustrated) is circulated.

The double pipe 50 comprises: a spiral-shaped spiral fin 10 provided as a heat transfer member; an inner pipe 20 for which the spiral fin 10 is provided on the interior; and an outer pipe 30 for which the inner pipe 20 is provided on the interior. The spiral fin 10, the inner pipe 20, and the outer pipe 30 use a metal such as aluminum, etc., as the material.

As will be described later, the spiral fin 10 is formed by a strip-shaped fin member 11 being twisted into a spiral shape.

The inner pipe 20 has an inner flow path 51 formed on the interior. Piping (not illustrated) for guiding refrigerant is connected to both ends (not illustrated) of the inner pipe 20.

The outer pipe 30 has an outer flow path 52 formed between itself and the inner pipe 20. A ring-shaped flow path gap 29 is formed between the outer pipe 30 and the inner pipe 20. Both ends of the flow path gap 29 are blocked. An inlet 58 and an outlet 59 for guiding refrigerant to the outer flow path 52 are opened in the outer pipe 30.

During operation of the air conditioning device, with the outer flow path 52, as shown by arrows A and B in FIG. 1, high temperature, high pressure liquid refrigerant flows through the inlet 58 and the outlet 59. On the other hand, with the inner flow path 51, as shown by arrows C and D in FIG. 1, low temperature, low pressure gaseous refrigerant flows through. In this way, refrigerants that flow through the outer flow path 52 and the inner flow path 51 do heat exchange with each other.

The inner pipe 20 and the spiral fin 10 configure a fin built-in pipe 40 as an element of the heat exchanger. During operation of the air conditioning device, with the fin built-in pipe 40, by the refrigerant that flows through the inner flow path 51 flowing through while turning in a spiral-shape along the spiral fin 10, the refrigerant is prompted to do heat exchange via the inner pipe 20.

Figure 2:
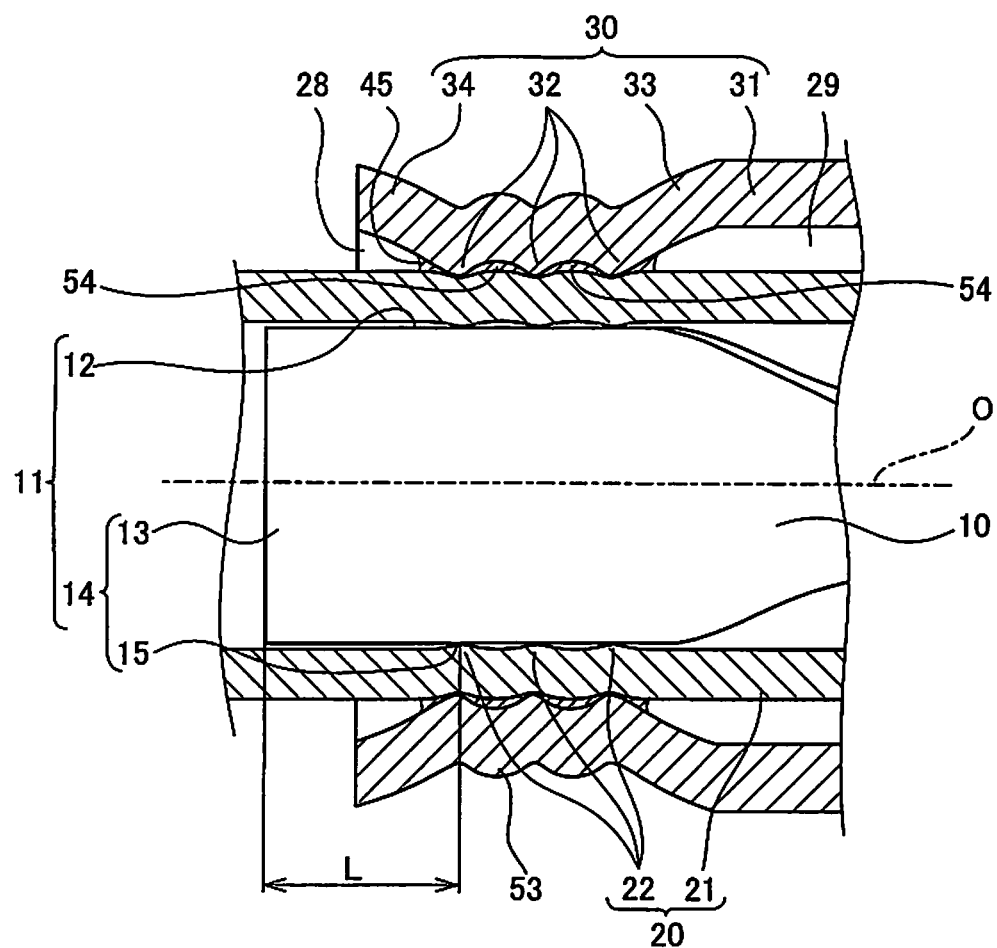
FIG. 2 is a cross section diagram of an enlarged portion of FIG. 1.

FIG. 2 is a cross section diagram showing an enlarged view of an end part 53 of the double pipe 50. With both end parts 53 of the double pipe 50, the outer pipe 30, the inner pipe 20, and the fin member 11 are fixed by crimping at the same position.

The outer pipe 30 has: a cylindrical body part 31; a substantially conical restriction wall part 33; a protruding type outer crimping part 32; and a substantially conical (funnel-shaped) opening end part 34.

The outer crimping part 32 is formed by crimping both end parts 53 of the body part 31. The outer crimping part 32 is formed by projecting to the inner diameter side from the body part 31, and is pressure welded on the outer circumference surface of the inner pipe 20. The outer crimping part 32 have a plurality formed while keeping regular intervals in the circumference direction, and are formed so that a plurality are aligned at regular intervals in the lengthwise direction. The plurality of outer crimping parts 32 aligned in the circumference direction are connected to each other, and reduce the diameter of the body part 31 of the outer pipe 30 along the entire circumference. Between the outer crimping parts 32 adjacent in the lengthwise direction, a retention part 54 is provided as a space for retaining a brazing material described later.

Note that "radial direction," "circumference direction," and "lengthwise direction" respectively mean the radiating direction with a center line O of the double pipe 50 as the center, the direction around the center line O, and the direction in which the center line O extends. Also, "inner diameter side" and "outer diameter side" respectively mean inward and outward in the radial direction.

The restriction wall part 33 is a ring-shaped part that curves continuously from each outer crimping part 32 and the body part 31. The restriction wall part 33 blocks one end of the flow path gap 29 with respect to the outside.

The opening end part 34 is a ring-shaped part that curves continuously from each outer crimping part 32. The opening end part 34 forms a gap (space) 28 that opens to the outside.

The inner pipe 20 has a cylindrical body part 21, and an inner crimping part 22 that does diameter reduction along the entire circumference from the body part 21.

The inner crimping part 22 is formed together with the outer crimping part 32 by crimping near both ends of the body part 31 of the outer pipe 30. The inner crimping part 22 is formed so as to project to the inner diameter side from the body part 21. The inner crimping part 22, the same as with the outer crimping part 32, has a plurality formed at regular intervals in the circumference direction, and has a plurality formed aligned at regular intervals in the lengthwise direction. The plurality of inner crimping parts 22 aligned in the circumference direction are connected to each other, and reduce the diameter of the body part 21 of the inner pipe 20 along the entire circumference.

The inner circumference of each inner crimping part 22 abuts both side ends 12 of the fin member 11, and both side ends 12 of the fin member 11 are fixed by crimping.

The fin member 11 has a fin fixing part 15 that abuts the inner circumference of each inner crimping part 22 and is fixed by crimping. The fin fixing part 15 is formed at a position having a prescribed distance L with respect to a tip 13 of the fin member 11. The spiral fin 10 has a strip-shaped fin end part 14 extending toward the tip 13 from the fin fixing part 15.

The double pipe 50 comprises a sealing part (45) (joining part) that joins the inner circumference of the outer crimping part 32 and the outer circumference of the inner crimping part 22 using brazing. The ring-shaped sealing part 45 seals between the outer pipe 30 and the inner pipe 20.

Next, the method for manufacturing the double pipe 50 is explained.

When manufacturing the double pipe 50, a crimping step for one end part 53, a forming step for forming the fin member 11 by twisting in a spiral shape, a crimping step for the other end part 53, and a joining step for joining the inner circumference of the outer pipe 30 to the outer circumference of the inner pipe 20 are performed in order.

Figure 3:
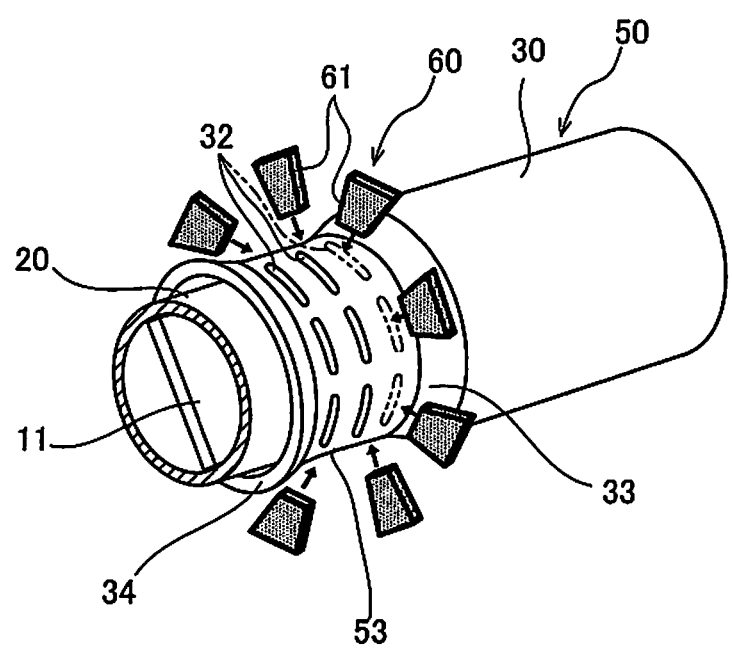
FIG. 3 is a perspective view of a crimping step.

First, with the crimping steps, a crimping device 60 shown in FIG. 3 is used. The crimping device 60 comprises: a plurality of (here, eight) tools 61 placed in radial form; a support mechanism (not illustrated) that supports each tool 61 to be able to move in the radial direction; and a drive mechanism (not illustrated) that drives each tool 61 synchronously with each other.

Figure 4:
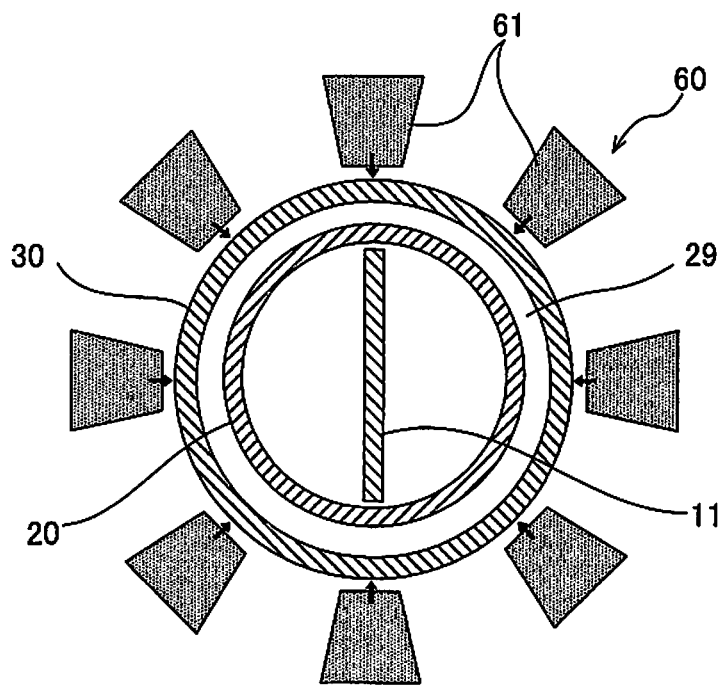
FIG. 4 includes diagrams (A) and (B) that are cross section diagrams of the crimping step.
Figure 4:
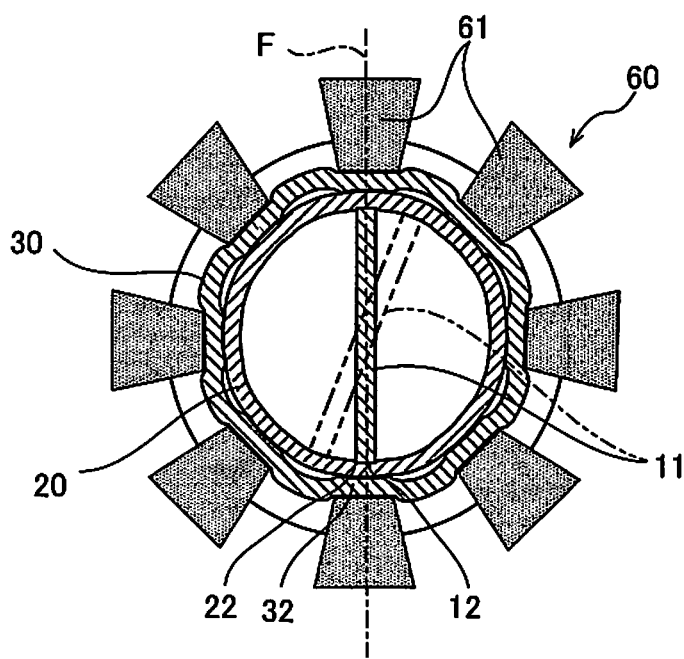

As shown in FIG. 4 (A), with the crimping step, the outer pipe 30 for which the fin member 11 and the inner pipe 20 are interposed in the interior is held at the inner diameter side of each tool 61 aligned in the circumference direction, and as shown by the arrow in the drawing, each tool 61 is synchronously driven into the outer circumference of the outer pipe 30.

FIG. 4 (B) shows the state with each tool 61 driven into the outer pipe 30 in this manner. With the outer pipe 30, the outer crimping part 32 is formed by each tool 61 having the drive-in site be plastically deformed.

Each outer crimping part 32 aligned in the circumference direction is placed following along the tip of each tool 61 driven into in the outer pipe 30 and also a polygon (here, an octagon). By doing this, by the part of the outer pipe 30 linked to each outer crimping part 32 being plastically deformed to substantially a conical shape, the restriction wall part 33 or the opening end part 34 is formed.

At this time, the outer crimping part 32 has its inner circumference abut the outer circumference of the inner pipe 20 by projecting to the inner diameter side. In other words, the inner pipe 20 is fixed to the outer pipe 30 by crimping.

Simultaneously, with the inner pipe 20, by doing pressure welding with the outer crimping part 32 at equal intervals in the circumference direction, the inner crimping part 22 is formed with reduced diameter across the entire circumference of the inner pipe 20. By the inner crimping part 22 abutting the side ends 12 of the fin member 11, the fin end part 14 is fixed to the inner pipe 20 by crimping.

In the process of the inner crimping part 22 having reduced diameter, when the inner circumference abuts both side ends 12 of the fin member 11, the inner crimping part 22 having diameter reduction greater than that is suppressed by the reaction force from the fin member 11. By doing this, the occurrence of variation in the deformation amount of the outer crimping part 32 and the inner crimping part 22 is suppressed.

As shown by the solid line in FIG. 4 (B), by the fin member 11 being placed to extend on a straight line F that connects an opposing pair of tools 61, the reaction force of the fin member 11 works in the movement direction of the tools 61. By the fin member 11 having a role of a stopper in this way, the movement amount of the tools 61 is restricted with good precision, and the variation in the deformation amount of the outer crimping part 32 and the inner crimping part 22 is suppressed to a low level. Also, by the inner circumference of the inner crimping part 22 being pressure welded to the fin member 11, the fin end part 14 (see FIG. 2) is held in the inner pipe 20.

The placement is not limited to that noted above, and as shown by the double dot-dash line in FIG. 4 (B), it is also possible to place the fin member 11 to be at an incline with respect to the straight line F. Specifically, it is also possible to place the fin member 11 at a position skewed in the circumference direction from the tip of the tool 61. In this case as well, by the movement amount of the tools 61 being restricted by the reaction force of the fin member 11, the variation in the deformation amount of the outer crimping part 32 and the inner crimping part 22 is suppressed. Also, by the inner circumference of the inner crimping part 22 being pressure welded to the fin member 11, the fin end part 14 (see FIG. 2) is held in the inner pipe 20.

Also, by suppressing to a low level the variation of the deformation amount of the outer crimping part 32 and the inner crimping part 22, with the retention part 54, the space does not become excessively large, and a space with an appropriate capacity is formed. By doing this, the amount of brazing material filled in the retention part 54 does not become large, and it is possible to avoid having a large usage amount of a brazing material B (see FIG. 7) used in the joining step as described later.

In this way, with one end part 53 of the double pipe 50, the outer pipe 30, the inner pipe 20, and the fin member 11 are simultaneously fixed by crimping at the same position.

Figure 5:
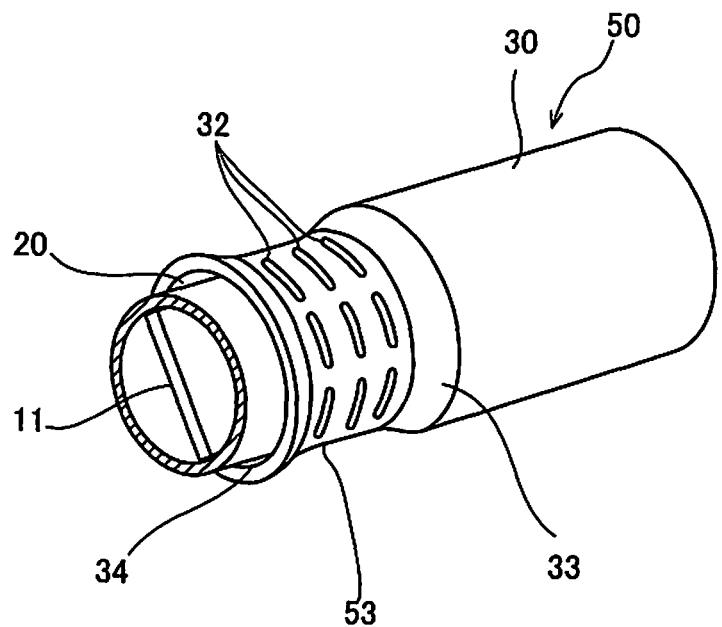
FIG. 5 includes diagrams (A) and (B) that are perspective views showing the double pipe.
Figure 5:
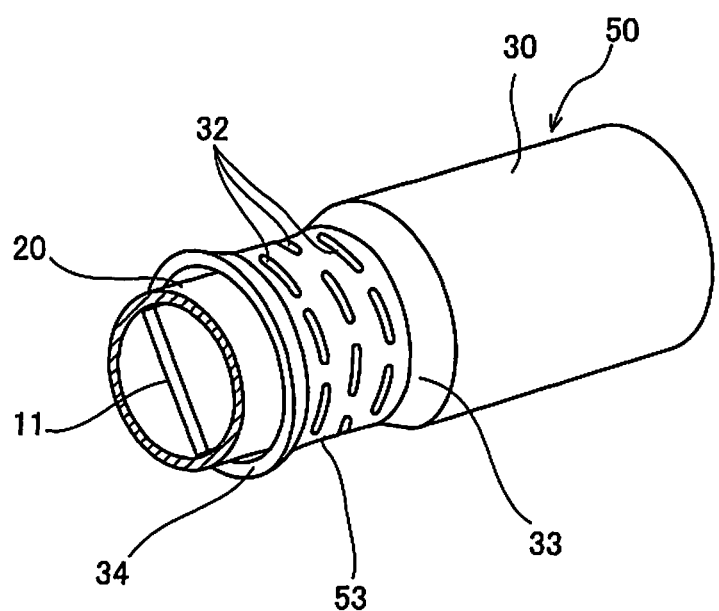

With the double pipe 50 shown in FIG. 5 (A), the plurality of (three) outer calking parts 32 aligned in the lengthwise direction have adjacent items to each other placed on a straight line. By doing this, the gaps formed between the outer crimping parts 32 aligned in the circumference direction and the outer circumference of the inner pipe 20 are aligned in a straight line. For this reason, in the joining step described later, the brazing material (joining material) is guided through the gaps in the lengthwise direction, and it is possible to form the sealing part 45 with the brazing material spreading up to the retention part 54 in the recess of the outer crimping part 32.

The present invention is not limited to the configuration noted above, and as shown in FIG. 5 (B), the double pipe 50 can also be configured with the plurality of (three) outer crimping parts 32 aligned in the lengthwise direction having adjacent items to each other offset in the circumference direction. In this case, because the gaps of the outer crimping parts 32 aligned in the lengthwise direction with each other become large, in the crimping step, the processing (plastic deformation) of each outer crimping part 32 is performed without mutual interference.

Next, the forming step for forming the fin member 11, etc., is performed.

Figure 6:
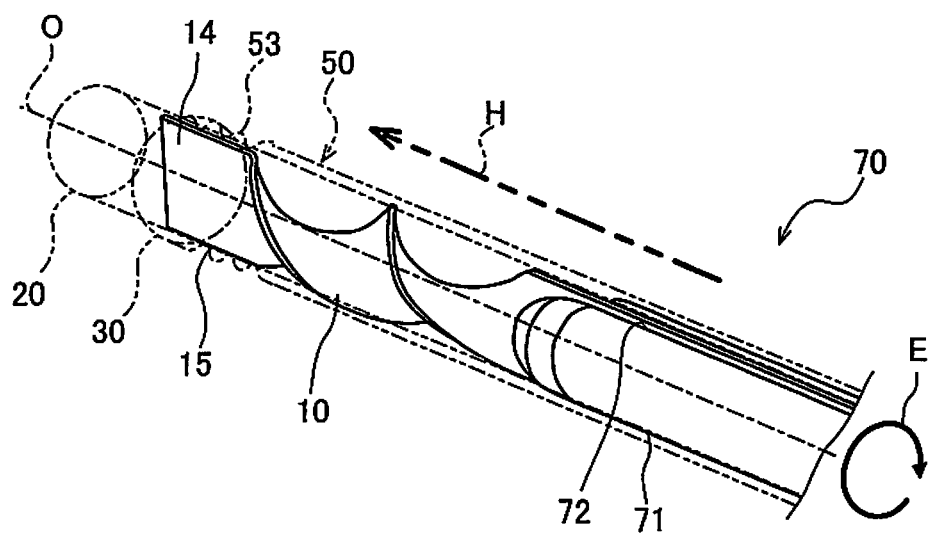
FIG. 6 is a perspective view of a forming step.

With the forming step, a forming device 70 shown in FIG. 6 is used. The forming device 70 comprises a core metal 71 inserted in the interior of the inner pipe 20. The round pillar shaped core metal 71 has a slit 72 that opens extending in the lengthwise direction.

With the forming step, first, a chuck (not illustrated) grips the outer circumference of the outer pipe 30, and the core metal 71 is inserted in the inner pipe 20. At this time, the fin member 11 is inserted in the slit 72 of the core metal 71.

Subsequently, as shown by arrow H in FIG. 6, the outer pipe 30 that was gripped by the chuck and the inner pipe 20 are moved in the center line O direction with respect to the core metal 71, and also, as shown by arrow E in FIG. 6, the core metal 71 is rotated in one direction with respect to the outer pipe 30 and the inner pipe 20.

By doing this, the spiral fin 10 is formed on the interior of the inner pipe 20 by the fin member 11 coming out from the slit 72 of the core metal 71 being twisted with the fin fixed part 15 as a fulcrum.

At this time, the movement speed for moving the core metal 71 in the center line O direction of the inner pipe 20, and the rotation speed for rotating the core metal 71 using the drive mechanism (not illustrated) are controlled. By doing this, the fin member 11 is twisted at an arbitrary position with respect to the inner pipe 20. With the fin built-in pipe 40, the position at which the fin member 11 is twisted with respect to the inner pipe 20 can be set arbitrarily.

In the process of moving the outer pipe 30 and the inner pipe 20 in the center line O direction, it is also possible to do bend processing of the outer pipe 30, the inner pipe 20, and the fin member 11 using a bending process machine (not illustrated).

Next, at the other end part 53 of the double pipe 50, the crimping step is performed. In this crimping step as well, the outer pipe 30, the inner pipe 20, and the fin member 11 are simultaneously fixed by crimping at the same position.

Next, the joining step for joining the sealing part 45 using brazing is performed. With this joining step, brazing material is used as the joining material. The sealing part 45 seals between the outer pipe 30 and the inner pipe 20 by the brazing material being filled in a ring shape without gaps.

Figure 7:
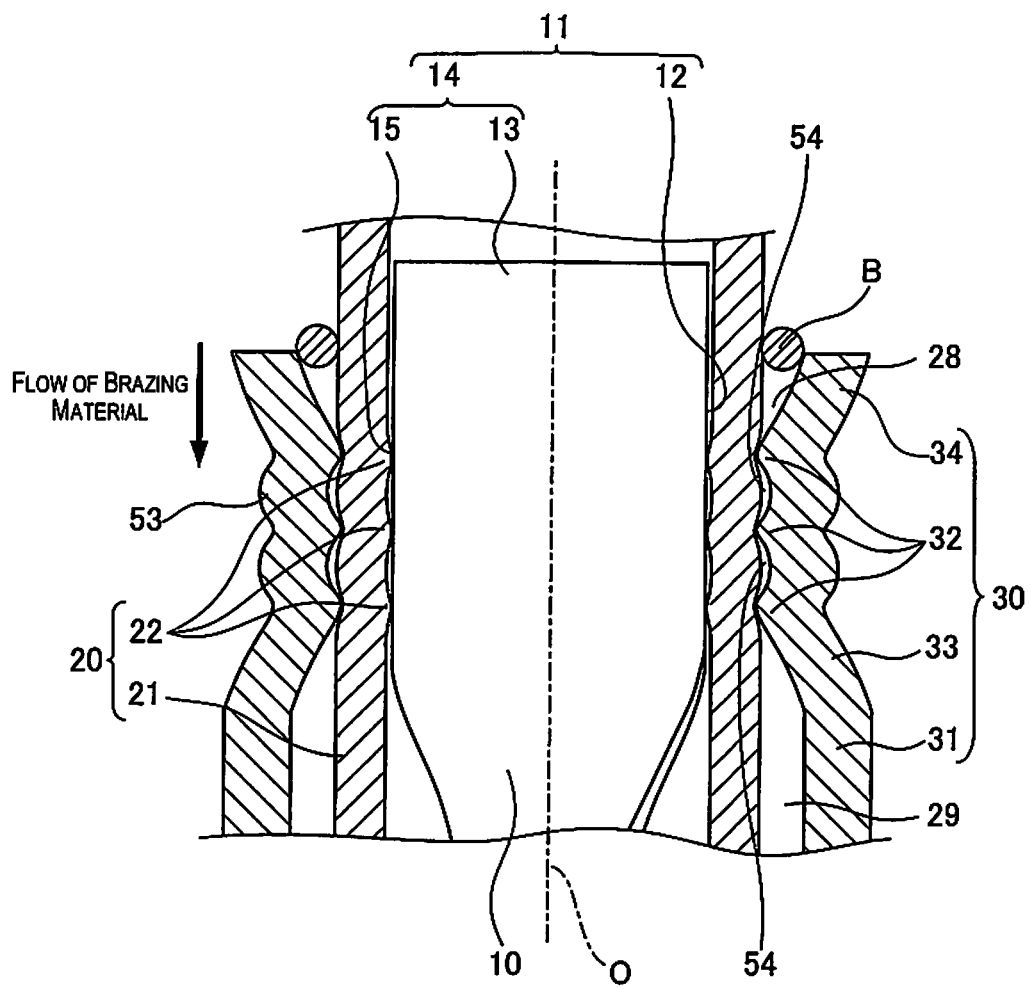
FIG. 7 is a cross section diagram of a joining step.

As shown in FIG. 7, with the joining step, the brazing material B is mounted on the space 28 with the opening end part 34 facing upward. Then, the brazing material B is melted using a torch, etc. By doing this, the melted brazing material B passes through the space between the outer crimping parts 32 adjacent in the circumference direction, and flows toward the outer flow path 52 between the outer pipe 30 and the inner pipe 20. At this time, the retention part 54 is formed between the adjacent outer crimping parts 32 in the lengthwise direction, so the brazing material flowing toward the outer flow path 52 is retained in the retention part 54. By doing this, it is possible to prevent the melted brazing material from reaching the inside of the outer flow path 52, in other words, the melting brazing material from infiltrating inside the outer flow path 52.

Also, as shown in FIG. 5 (A), with the double pipe 50, by the outer crimping parts 32 being formed so as to align in three locations on a straight line in the lengthwise direction, it is possible to more reliably prevent the infiltration of the brazing material to inside the outer flow path 52.

The double pipe 50 is not limited to the configuration noted above, and as shown in FIG. 5 (B), by having the outer crimping parts 32 that are adjacent to each other in the lengthwise direction be offset in the circumference direction, the flow of the brazing material that passed through the space between the outer crimping parts 32 adjacent in the circumference direction is obstructed by the adjacent row of outer crimping parts 32, so it is possible to further prevent the penetration of the brazing material to inside the outer flow path 52.

The double pipe 50 is manufactured as described above. Next, the effects of the present embodiment are explained.

With the present embodiment, the double pipe 50 has the inner pipe 20 provided having a flow path gap 29 in the interior of the outer pipe 30, and the fin member 11 is provided on the interior of the inner pipe 20. The outer pipe 30 has the outer crimping part 32 projecting to the inner diameter side. The inner pipe 20 has the inner crimping part 22 overlapping the outer crimping part 32. The sealing part 45 that seals between the outer pipe 30 and the inner pipe 20 is provided between the outer pipe 30 and the inner pipe 20. Also, the fin member 11 is held by the inner crimping part 22.

Also, with the present embodiment, provided is the method for manufacturing the double pipe 50 for which the inner pipe 20 is deformed by crimping the outer pipe 30 to form the inner crimping part 22, and by forming the inner crimping part 22, the fin member 11 is held by the inner crimping part 22, and the sealing part 45 that seals between the outer pipe 30 and the inner pipe 20 is provided between the outer pipe 30 and the inner pipe 20.

By doing this, the double pipe 50 has the outer pipe 30, the inner pipe 20, and the fin member 11 fixed by crimping simultaneously, so it is possible to reduce the man-hours for forming each member. Thus, it is possible to produce the double pipe 50 with good efficiency.

Also, with the outer pipe 30 and the inner pipe 20, since the outer crimping part 32 and the inner crimping part 22 which are deformed parts deformed by crimping are aligned in the radial direction, the shape precision of the gaps formed between the outer pipe 30 and the inner pipe 20 is increased. By doing this, the quality of the sealing part 45 formed between the outer pipe 30 and the inner pipe 20 is increased.

Also, with the double pipe 50, the outer crimping part 32 and the inner crimping part 22 are respectively formed with a plurality aligned in the lengthwise direction.

By doing this, the plurality of inner crimping parts 22 abut the fin member 11 aligned in the lengthwise direction. By doing this, the fixing power of the fin end parts 14 is increased, the fin end parts 14 are made to not move with respect to the inner pipe 20 in the forming step, and it is possible to form the spiral fin 10 in the intended shape.

Also, with the double pipe 50, the outer crimping part 32 and the inner crimping part 22 are respectively formed with a plurality aligned in the circumference direction.

By doing this, in the crimping step, because the plurality of outer crimping parts 32 are pressure welded aligned in the circumference direction with respect to the inner crimping part 22, the inner crimping part 22 has reduced diameter across the entire circumference of the inner pipe 20. Thus, the inner crimping part 22 can hold the fin member 11 without regard to the angular position of the fin member 11 with respect to the inner pipe 20. Also, in the joining step, the brazing material flows to the flow path 52 through the gap between the outer crimping parts 32 adjacent in the circumference direction, and it is possible to expand to a wide range between the outer pipe 30 and the inner pipe 20. This improves sealability.

Also, with the double pipe 50, the outer crimping parts 32 and the inner crimping parts 22 are respectively formed with a plurality aligned in the lengthwise direction and the circumference direction. Also, between the outer crimping parts 32 and the inner crimping parts 22 adjacent in the lengthwise direction, formed is the retention part 54 for retaining the brazing material.

By doing this, it is possible to retain in the retention part 54 the melted brazing material between the outer pipe 30 and the inner pipe 20, so it is possible to prevent infiltration of the brazing material to the inside of the outer flow path 52.

Also, with the double pipe 50, a gap in which the brazing material flows is formed between outer crimping parts 32 adjacent in the circumference direction.

By doing this, the brazing material goes through the gap between the outer crimping parts 32 adjacent in the circumference direction and fills the retention part 54. This improves the sealability.

Also, with the double pipe 50, the outer crimping parts 32 that are adjacent to each other in the lengthwise direction are offset in the circumference direction.

By doing this, by having the outer crimping parts 32 that are adjacent to each other in the lengthwise direction be offset in the circumference direction, the flow of the brazing material that passed through the space between the outer crimping parts 32 adjacent in the circumference direction is obstructed by the adjacent row of the outer crimping parts 32. By doing this, it is possible to further prevent penetration of the brazing material to inside the outer flow path 52.

Also, with the double pipe 50, the outer pipe 30 further has a ring-shaped restriction wall part 33 that curves continuously from the plurality of outer crimping parts 32 aligned in the circumference direction. The restriction wall part 33 blocks one end of the flow path gap 29.

By doing this, by forming the plurality of outer crimping parts 32 aligned in the circumference direction, the restriction wall part 33 that blocks one end of the flow path gap 29 is formed. Thus, it is possible to produce the double pipe 50 efficiently.

Also, with the present embodiment, provided is the method for manufacturing the double pipe 50 for which the spiral fin 10 is formed by twisting the fin member 11 in the interior of the inner pipe 20.

By doing this, during manufacturing of the double pipe 50, by forming the spiral fin 10 by twisting the fin member 11 in the interior of the inner pipe 20, the step of inserting the spiral fin 10 after forming into the interior of the inner pipe 20 is eliminated. Thus, it is possible to produce the double pipe 50 efficiently.

Embodiments of the present invention were explained above, but the abovementioned embodiments merely show a portion of application examples of the present invention, and are not intended to limit the claims of the present invention to the specific configurations of the embodiments noted above.

For example, the double pipe 50 of the abovementioned embodiments is suitable as a heat exchange tube that configures the heat exchanger, but it is also possible to apply this to a mechanism or equipment used for other than a heat exchanger.

Also, the double pipe 50 can be used as a heat exchanger even with a configuration that does not comprise the spiral fin 10.

The invention claimed is:

1. A double pipe comprising:
    an outer pipe having a plurality of outer crimping parts projecting to an inner diameter side and aligned in a lengthwise direction and a circumference direction of the double pipe and
    an inner pipe arranged on an interior of the outer pipe with a flow path gap being defined between the outer pipe and the inner pipe, the inner pipe having a plurality of inner crimping parts aligned in the lengthwise direction and overlapping the outer crimping parts;
    a fin member arranged on the interior of the inner pipe and held by the inner crimping parts; and
    a sealing part sealing between the outer pipe and the inner pipe, wherein
    the outer pipe further has a ring-shaped restriction wall part that curves continuously from the outer crimping parts aligned in the circumference direction, and the restriction wall part blocks one end of the flow path gap.

2. The double pipe of claim 1, wherein
a brazing material is retained in a retention part defined between the outer crimping parts and the inner crimping parts adjacent in the lengthwise direction.

3. The double pipe of claim 2, wherein
a gap in which the brazing material flow is defined between the outer crimping parts and the inner crimping parts adjacent in the circumference direction.

4. The double pipe of claim 2, wherein
the outer crimping parts and the inner crimping parts adjacent to each other in the lengthwise direction are offset in the circumference direction.

5. A method for manufacturing a double pipe having an outer pipe, an inner pipe arranged on an interior of the outer pipe with a flow path gap being defined between the outer pipe and the inner pipe, and a fin member is arranged on an interior of the inner pipe, the method comprising:
crimping the outer pipe to deform the inner pipe and forming a plurality of outer crimping parts and a plurality of inner crimping parts aligned in a lengthwise direction and a circumference direction of the double pipe so that the fin member is held by the inner crimping parts, the outer pipe further having a ring-shaped restriction wall part that curves continuously from the outer crimping parts aligned in the circumference direction so that the restriction wall part blocks one end of the flow path gap; and
providing a sealing part between the outer pipe and the inner pipe to seal between the outer pipe and the inner pipe.

\* \* \* \* \*